United States Patent
Bodo et al.

(10) Patent No.: US 7,386,147 B2
(45) Date of Patent: Jun. 10, 2008

(54) METHOD FOR THE WATERMARKING OF A VIDEO SEQUENCE WITH ADAPTIVE SELECTION OF THE WATERMARK INSERTION ZONE, CORRESPONDING DETECTION METHOD, DEVICES, DATA CARRIER AND COMPUTER PROGRAM

(75) Inventors: Yann Bodo, Rennes (FR); Nathalie Laurent, Vignoc (FR)

(73) Assignee: France Telecom, Paris (FR)

( * ) Notice: Subject to any disclaimer, the term of this patent is extended or adjusted under 35 U.S.C. 154(b) by 725 days.

(21) Appl. No.: 10/811,312

(22) Filed: Mar. 26, 2004

(65) Prior Publication Data

US 2004/0247154 A1 Dec. 9, 2004

(30) Foreign Application Priority Data

Apr. 11, 2003 (FR) .................................. 03 04590

(51) Int. Cl.
*G06K 9/00* (2006.01)
(52) U.S. Cl. ...................................................... 382/100
(58) Field of Classification Search ................. 382/100
See application file for complete search history.

(56) References Cited

U.S. PATENT DOCUMENTS

| 5,960,081 | A | 9/1999 | Vynne et al. |
| 6,845,130 | B1 * | 1/2005 | Han et al. ............... 375/240.16 |
| 6,957,350 | B1 * | 10/2005 | Demos ........................ 380/203 |
| 2004/0175017 | A1 * | 9/2004 | Bodo et al. .................. 382/100 |

OTHER PUBLICATIONS

Zhu Zhongjie et al., "New adaptive algorithm for video water marking", IEEE TENCOM' 02. Beijing, China, Oct. 28-31, 2002. vol. 1 pp. 152-155 Oct. 28, 2002.

Jun Zhang et al., "Embedding watermark in MPEG video sequence", 2001 IEEE 4th workshop pp. 535-540 Oct. 3, 2001.

French patent application No. FR 02 13660 filed Oct. 31, 2002, "Procédé de tatouage d' un signal vidéo, système, support de données pour la mise en oeuvre de ce procédé, procédé d'extraction du tatouage d' un signal vidéo, système pour la mise en oeuvre de ce procédé" (Method for the watermarking of a vidéo signal, system, data carrier for the implementation of this method, method for the extraction, from the watermark, of a video signal, system for the implementation of this method).

(Continued)

*Primary Examiner*—Matthew C. Bella
*Assistant Examiner*—Dennis Rosario
(74) *Attorney, Agent, or Firm*—Westman, Champlin & Kelly (57) ABSTRACT

A method for the watermarking of a sequence of video images implements a step for the insertion of at least one watermarking bit into at least one motion vector obtained by motion estimation between two images of said sequence, so as to obtain at least one watermarked motion vector. The motion vector is identified by its coordinates in a reference space, partitioned into two types of complementary zones, each having a distinct binary value associated with it. The insertion step implements, if necessary, a modification of the coordinates of said motion vector so that it is located in a binary value zone corresponding to said watermarking bit to be inserted. During said modification, at least two potential watermarked motion vectors are determined and, from among said potential watermarked motion vectors, an optimal watermarked motion vector is selected according to at least one predetermined criterion, so that the modified coordinates of said motion vector are those of said optimal watermarked motion vector.

21 Claims, 5 Drawing Sheets

OTHER PUBLICATIONS

Fred Jordan et al., "Proposal of a Watermarking Technique for Hiding/Retrieving Data in Compressed and Decompressed Video", EPEL, /IEC document JTCQ/SC29/WG11/MPEG9, Jul. 1997, pp. 1-4.

Jun Zhang et al., "Video Watermark Technique in Motion Vector", IEEE, 2001, pp. 179-182.

* cited by examiner

METHOD FOR THE WATERMARKING OF A VIDEO SEQUENCE WITH ADAPTIVE SELECTION OF THE WATERMARK INSERTION ZONE, CORRESPONDING DETECTION METHOD, DEVICES, DATA CARRIER AND COMPUTER PROGRAM

FIELD OF THE INVENTION

The field of the invention is that of the watermarking of video sequences. This watermarking consists of the insertion, into the video sequence, of a mark that is invisible to the user and designed to protect the contents of the sequence and enable its copies to be traced.

More specifically, the invention relates to a method for the watermarking of a video sequence by the insertion of a binary mark on the motion vectors of the video.

BACKGROUND OF THE INVENTION

There are several known techniques to date for the watermarking of video sequences.

One of these techniques consists of the application, to the video sequences, of watermarking methods similar to those used for the watermarking of still images. Indeed, it can be assumed that a video stream consists of a sequence of still images and that the "intra" images of the sequence can therefore be watermarked according to a scheme conventionally applied to the still images.

However, video sequences have many properties that can be advantageously exploited to develop a watermarking technique that is proper to them.

These properties include the following aspects:
the rough size of a video sequence is far greater than that of a still image, so that the insertion space of a mark is far greater in a video sequence;
as compared with still images, video sequences have a time dimension, which can be used for the insertion of the mark.

Furthermore, video sequences have constraints different from those of still images. Thus:
the complexity of the watermarking scheme of a video sequence must be low enough to enable the insertion and detection of a mark to be done on the fly;
the mark of a video sequence must be less visible than in the case of a still image, because the motion of the objects often increases its perceptibility to the user;
the video streams are often compressed in order to reduce the rough size of the sequences. The compression standard most commonly used is the MPEG2 standard, and the mark can be inserted directly into the format itself. However, insertion into the decompressed format should not result in an increase in file size after compression;
video sequences can undergo more attacks than still images, and this often leads to the insertion of the mark or watermark redundantly so as to reduce the chances of success of these attacks, and make the watermark more robust. When the watermark is inserted redundantly in the sequence, it may be estimated through a computation of an average value on all the images of the sequence. An additional constraint therefore is that it should be possible to detect the watermark or signature even after a loss of synchronization produced by the selection of a precise sub-sequence of the video sequence considered, or by the loss of images of the sequence.

In addition to watermarking techniques from the field of still images, watermarking techniques proper to video have also been developed. These techniques make use of the advantageous properties of video sequences, in taking account of the constraints associated with them.

Among watermarking techniques specific to video, several approaches relying on the insertion of a mark into motion vectors have been proposed, especially by F. Jordan, M. Kutter, T. Ebrahimi in "*Proposal of a watermarking technique for hiding/retrieving data in compressed and decompressed video*", ISO/IEC document JTC1/SC29/WG11/MPEG97/M2281, July 1997, and by J. Zhang, J. Li, L. Zhang in "*Video watermarking technique in motion vector*", Proc. XIV Brazilian symposium on computer graphics and image processing, 15-18.10.2001, pp 179-182.

F. Jordan et al. have proposed a marking algorithm in which the mark is inserted into the motion vectors of a video. This technique relies on the implementation of the following steps:

a first step for the generation of the mark, which is a binary sequence having a length of 16 bits or 32 bits;

a second step for the insertion of the mark. To do this, the motion vectors are extracted from the compressed video stream, obtained by an MPEG4 codec (or coder-decoder). If the video stream is decompressed, there is a preliminary step of compression of this stream. The different marking steps are applied to one of the two components of the motion vectors. One block of pixels per image is selected randomly and its motion vector is computed. Two bits of the mark are inserted into each component of the motion vector.

If V denotes the vertical component of a motion vector, and if b={0,1} is the value of the bit to be concealed, then the following is the algorithm for the insertion of b into V:

if $((V*q+T) \bmod [2] \neq b)$ then $V'=V+\delta$ else $V'=V$ with T=2*dim dim=size of the search window for the motion estimation $\delta=(2 \cdot n+1)/q$ n=1 if the motion vector is the null vector.

n=0 else q=factor of modulation of the amplitude of the motion vector

V' is the marked motion vector.

In other words, as many motion vectors are selected as there are bits in the mark, namely 16 or 32. Then, for each of the 16 or 32 vectors selected, the corresponding bit of the mark is inserted into one of the components of the motion vector, for example the vertical component, in modifying its parity.

a third step for the extraction of the mark, during which the motion vector marked V' is extracted from the compressed stream. The mark is then extracted as follows:

$b=(V'*q+T) \bmod [2]$

J. Zhang et al. propose an improvement of the above method proposed by F. Jordan et al., but their approach nevertheless remains the same.

These two techniques therefore rely on the implementation of a watermarking algorithm, based on the insertion of a mark within the motion vectors of a video.

However, a major drawback of these prior art techniques is that they do not have sufficient robustness with respect to possible attacks against video sequences. In particular, such methods are not sufficiently robust against non-malicious attacks such as compression or (spatial or temporal) changes in the format of the video signal.

Indeed, the above techniques proposed by F. Jordan and al. or by J. Zhang et al. rely on the implementation of a watermarking algorithm, based on the insertion of a mark into the motion vectors of a video sequence, using the notion of parity for the ordinate value of these motion vectors.

This approach is by definition not robust since the smallest attack can convert an even-parity ordinate value into an odd-parity ordinate value and vice versa.

Furthermore, according to these techniques, it is generally always the same predetermined component of the selected motion vectors (for example the vertical component) that is modified. This has the effect of increasing the visibility of the mark in the video sequence. The visibility of the mark is of course disagreeable to the user who perceives a deformation of the image.

In order to overcome these different drawbacks, the inventors of the present patent application have developed a new more robust technique for the watermarking of a video sequence described in the French patent application No. FR 02 13660 dated 31 Oct. 2002, filed by the present applicant and entitled "Procédé de tatouage d'un signal vidéo, système, support de données pour la mise en œuvre de ce procédé, procédé d'extraction du tatouage d'un signal vidéo, système pour la mise en œuvre de ce procédé" (Method for the watermarking of a video signal, system, data carrier for the implementation of this method, method for the extraction, from the watermark, of a video signal, system for the implementation of this method)

According to this technique, a motion vector that will carry the watermark is selected. The coordinates of the selected motion vector are identified in a space comprising a first plurality of zones associated with the binary value 1 and a second plurality of zones associated with the binary value 0. Then, if necessary, the coordinates of the selected motion vector are modified so that it is located in the zone in which the binary value corresponds to the value of the mark to be inserted into the selected motion vector.

Thus, if it is desired to insert a mark with a value 0, and if the selected motion vector is located in a zone associated with the binary value 1, the coordinates of the motion vector are modified by obtaining a weighted central or axial symmetry relative to the edges of the zone.

This technique proves to be therefore more robust than the methods proposed by F. Jordan and al. or by J. Zhang et al., because it defines the limited space in which the end of the motion vectors is located (zones with a binary value 1 or 0). The watermarking made therefore no longer relies solely on a change in parity of the component of a motion vector but on the shift of the vector to be watermarked over a relatively large zone.

As a consequence, even in the case of the filtering or light conversion of the image, leading to a modification of the coordinates of the watermarked motion vector, the end of this vector remains within the zone of the binary value chosen as a function of the mark. The mark is therefore robust against such attacks. However, although it is more robust, this technique is not optimal in terms of the invisibility of the mark. Indeed, the marked motion vectors cause deformation in the image which is sometimes troublesome for the user.

Furthermore, the robustness of this technique against more common attacks such as compression, cropping or mirror type attacks for example is not sufficient or could be improved.

SUMMARY OF THE INVENTION

It is a goal of the invention especially to overcome these drawbacks of the prior art.

More specifically, it is a goal of the invention to provide a technique for the watermarking of a video sequence having increased robustness as compared with the prior art techniques. In particular, it is a goal of the invention to provide a technique of this kind that is particularly resistant to malicious attacks as well to more common attacks of the filtering or compression type.

It is another goal of the invention to implement a technique of this kind that reduces the visibility of the mark or watermark as compared with prior art techniques. In particular, it is a goal of the invention to provide a video watermarking technique, according to which a mark is inserted into one or more motion vectors, and that makes it possible to minimize the deformations of the marked vectors as compared with the prior art techniques.

It is yet another goal of the invention to provide a technique of this kind for the faster detection of a mark in a watermarked video sequence.

It is another goal of the invention to provide a technique of this kind that is simple to implement and costs little in terms of resources.

These goals as well as others that will appear here below are achieved by means of a method for the watermarking of a sequence of video images implementing a step for the insertion of at least one watermarking bit on at least one motion vector obtained by motion estimation between two images of said sequence, so as to obtain at least one watermarked motion vector. The motion vector is identified by its coordinates in a reference space, partitioned into two types of complementary zones, each having a distinct binary value associated with it. If necessary, the insertion step implements a modification of the coordinates of the motion vector so that it is located in a binary value zone corresponding to said watermarking bit to be inserted.

According to the invention, during said modification, at least two potential watermarked motion vectors are determined and, from among said potential watermarked motion vectors, an optimal watermarked motion vector is selected according to at least one predetermined criterion, so that the modified coordinates of said motion vector are those of said optimal watermarked motion vector.

Thus, the invention relies on an entirely novel and inventive approach to the watermarking of video sequences that takes account of an intrinsic characteristic of video, that is motion. Indeed, the technique of the invention relies on the insertion of a mark or watermark into one or more motion vectors of a video sequence that implements a modification of the coordinates of the selected motion vector or vectors.

Furthermore, the invention relies on an adaptive selection of the zone of insertion of the mark, and therefore constitutes an improvement of the technique described in the French patent application No. FR 02 13660. Indeed, the coordinates of the watermarked motion vector are no longer obtained by simple central or axial symmetry relative to the boundaries of the two zones having binary values 0 and 1, but are those of an optimal watermarked motion vector. This optimal watermarked vector is chosen as a function of a predetermined criterion from among a plurality of motion vectors representing potential watermarked motion vectors belonging to different potential zones of insertion of the mark.

The optimal watermarked motion vector belongs to an optimal zone of insertion of the mark which, when judiciously chosen, increases the force of the mark and its transparency relative to the prior art, and therefore improves its detection speed.

Thus, as compared with the technique of the application No. FR 02 13660, the operation for obtaining a watermarked motion vector is no longer limited to the application of a predetermined geometrical transformation to the selected motion vector. Rather, the operation considers a set of motion vectors representing potential watermarked motion vectors, among which a vector that can be used to obtain the best watermarking of a sequence (in terms of robustness, of transparency, and of speed of detection of watermarking for example) is selected.

A level is therefore added in the decision-making process for the watermarking of the sequence, thus increasing both the robustness and the invisibility of the mark.

Preferably, said predetermined criterion is a criterion of invisibility of said watermarking.

Such a criterion can also be a criterion of resistance of the mark to certain types of attacks (involving compression or filtering for example) or again a criterion of speed of detection of the mark in a watermarked video sequence.

Advantageously, said reference space is associated with a reference grid comprising blocks of predetermined dimensions, each of said blocks comprising a zone of each of said types.

In a two-dimensional space, a reference grid of this kind may be a grid of the Cartesian space associated with an orthogonal reference system, constituted by a set of angular or square blocks. In a preferred embodiment of the invention, each block has smaller-sized sub-block, centered within the block, corresponding to one of the types of zone (for example the zone associated with a binary value 1). The other zone (for example the zone associated the binary value 0) corresponds to the complementary value of the sub-block within the block, and is located between the sub-block and the boundaries of the block.

Advantageously, since said motion vector is located in a block of said reference grid called a reference block, said potential watermarked motion vectors are searched for in a zone of said reference block having a binary value corresponding to said watermarking bit.

Thus, the totality of the zone of the block associated with the value 0 or 1 to be inserted into the selected motion vector is scanned; the scanning covers all the motion vectors belonging to this zone (or only some of them), representing potential watermarked motion vectors, and among these, a choice is made as a function of the criterion chosen of the optimal watermarked motion vector. When the criterion is a criterion of invisibility of the mark, the optimal vector is the one that makes the mark least visible to the user.

Preferably, said potential watermarked motion vectors are also searched for in a binary value zone corresponding to said watermarking bit belonging to at least one block adjacent to said reference block.

Indeed, the inventors of the present patent application advantageously make use of the fact that the optimal watermarked vector is not necessarily the vector whose coordinates are closest to those of the watermarked motion vector.

When the chosen criterion is a criterion of invisibility of the mark, it is therefore possible that the optimal watermarked motion vector will not belong to the same reference grid block as the motion vector initially selected to carry the mark but that, on the contrary, it will be geographically at a fairly great distance.

According to a preferred variant of the invention, said potential watermarked motion vectors are all the motion vectors located in said zone being searched.

Thus, the operation considers all the motion vectors located in the zone or zones in which the optimal watermarked vector is searched for; it is thus possible to carry out a pixel-by-pixel scan of the totality of the search zone or zones belonging to one or more blocks of the reference grid to consider all the motion vectors which represent potential watermarked motion vectors.

Advantageously, said predetermined criterion is a criterion of optimization of a peak signal-to-noise ratio (PSNR) associated with the each of said potential watermarked motion vectors.

The PSNR (or "Peak Signal-to-Noise ratio") is commonly used in image and video processing. It assesses the degree of fidelity of an image relative to a reference image: in this case, it enables for example the measurement of the degree of fidelity of a watermarked image of a video sequence relative to a non-watermarked original image. Among all the motion vectors representing potential watermarked motion vectors, the optimal watermarked vector is the one used to obtain the best PSNR.

Preferably, since an image of said video sequence is associated with at least two hierarchical levels, said method implements a motion estimation on at least one pair of images of said sequence for at least one of said levels, called an estimated level so as to determine a set of motion vectors of said estimated level, and the motion vectors of a higher hierarchical level are obtained by computing an average of the associated motion vectors in said estimated level.

The invention therefore also exploits the notion of a hierarchy of motion vectors, enabling a further increase in the robustness of the mark. For example, in a blockwise approach, an image of the video sequence may be considered to be a set of four blocks of pixels of the image, themselves divided into four respective sub-blocks having a smaller number of pixels and so on and so forth until the unity sub-block having the size of one pixel. At each breakdown level, it is possible to associate a motion vector with the corresponding block or sub-block.

Advantageously, a watermarking method such as this comprises a step for the selection, from among the motion vectors of the highest hierarchical level, of at least one motion vector at which said step for the insertion of a watermarking bit is implemented.

For example, it is chosen to insert a watermarking bit into the motion vector of one in every two blocks at the highest hierarchical level.

Preferably, said modification of the coordinates of said selected motion vector is also applied to the corresponding motion vectors of at least one of said lower levels, so as to perform a redundant insertion of said watermarking bit.

Thus, when it is chosen to insert a watermarking bit into a motion vector of the highest hierarchical level, this insertion is also carried over into the corresponding motion vectors of the lower level.

According to an advantageous characteristic of the invention, said motion estimation is of the "block matching" type.

A "block matching" technique of this kind is used to compute the motion vector associated with a block of pixels of the image. It evaluates the best motion vector used to reconstruct this current block from a block of the same size of the preceding image or a following image of the sequence, shifted by means of the motion vector.

Preferably, a watermarking method of this kind also comprises a step of motion compensation based on said watermarked motion vector or vectors so as to generate a watermarked video image sequence.

This step enables the reconstruction of a watermarked video sequence, in the form of a succession of compensated images, obtained from the original images to which the optimal watermarked motion vectors are applied.

According to a first advantageous variant of the invention, each of said motion vectors being associated with a region of said image, said motion compensation is implemented on all the regions of said image associated with watermarked or non-watermarked motion vectors.

According to a second advantageous variant of the invention, said motion vectors being each associated with a region of said image, said motion compensation is implemented in the region or regions of said image with which said watermarked motion vector or vectors are associated, and an image of said watermarked video image sequence comprises said regions on which said motion compensation is implemented and at least one original region.

Thus, two methods can be envisaged within the framework of the invention.

In the first method, the motion compensation is obtained by means of the set of motion vectors, whether watermarked or not watermarked, associated with the image to receive a watermarked version of the image considered.

A second method is used to perform the motion compensation only for blocks of pixels of the image corresponding to the motion vectors modified by the watermarking operation and to leave the other image blocks considered unchanged in order to obtain an image and therefore a video sequence of higher quality.

The invention also relates to a method for the extraction of a watermark from a sequence of video images watermarked according to the watermarking method described here above.

According to the invention, such a method of extraction comprises a step for the extraction of at least one watermarking bit inserted into at least one watermarked motion vector, said extraction step comprising sub-steps of:
  motion estimation between two images of said sequence, so as to obtain said at least one watermarked motion vector;
  analysis of the position of said watermarked motion vector in a reference space, partitioned into two types of complementary zones, each of which has a distinct binary value associated with it;
  the assigning to said watermarking bit of the binary value of the zone in which said motion vector is located.

Advantageously, said watermarking bit being inserted redundantly into said video image sequence, said method of extraction comprises a step for the computation of at least one correlation coefficient used to assign an index of trust to said extracted watermarking bit.

The invention also relates to a device for the watermarking of a video image sequence, comprising means for the insertion of at least one watermarking bit into at least one motion vector obtained by motion estimation between two images of said sequence, so as to obtain at least one watermarked motion vector, said motion vector being identified by its coordinates in a reference space, partitioned into two types of complementary zones, each of which has a distinct binary value associated with it, said insertion means comprising means, activated if necessary, for the modification of the coordinates of said motion vector so that it is located in a binary value zone corresponding to said watermarking bit to be inserted.

According to the invention, said modification means comprise means for determining at least two potential watermarked motion vectors and for the selection, from among said potential watermarked motion vectors, of an optimal watermarked motion vector, according to at least one predetermined criterion, so that the modified coordinates of said motion vector are those of said optimal watermarked motion vector.

The invention also relates to a device for the extraction of a watermark from a sequence of watermarked video images according to the watermarking method described here above. According to the invention, such a device comprises means for the extraction of at least one watermarking bit inserted into at least one watermarked motion vector, said extraction means comprising means of:
  motion estimation between two images of said sequence, so as to obtain said at least one watermarked motion vector;
  analysis of the position of said watermarked motion vector in a reference space, partitioned into two types of complementary zones, each of which has a distinct binary value associated with it;
  the assigning to said watermarking bit of the binary value of the zone in which said motion vector is located.

The invention also relates to a digital data carrier that can be read by a terminal, comprising means for the storage of the signal representing a watermarked sequence of video images according to the watermarking method described here above.

The invention also relates to a computer program comprising program code instructions for the execution of the steps of the watermarking method described here above when said program is executed on a computer.

The invention also relates to a computer program product comprising program code instructions recorded in a carrier that can be used in a computer, comprising:
  computer-readable programming means to perform a step for the insertion of at least one watermarking bit into at least one motion vector obtained by motion estimation between two images of said sequence, so as to obtain at least one watermarked motion vector, said motion vector been identified by its coordinates in a reference space, partitioned into two types of complementary zones, each of which has a binary value associated with it;
  computer-readable means to perform a step for the modification, if necessary, of the coordinates of said motion vector so that it is located in a binary value zone corresponding to said watermarking bit to be inserted;
  computer readable means to perform a step for determining at least two potential watermarked motion vectors and a step for the selection, from among said potential watermarked motion vectors, of an optimal watermarked motion vector according to at least one predetermined criterion, so that the modified coordinates of said motion vector are those of said optimal watermarked motion vector.

The invention finally relates to a signal representing a video image sequence watermarked according to the watermarking method described here above.

BRIEF DESCRIPTION OF THE DRAWINGS

Other features and advantages of the invention shall appear more clearly from the following description of a preferred embodiment, given by way of sample, illustrative and non-restrictive example, and from the appended drawings, of which.

DETAILED DESCRIPTION OF THE PREFERRED EMBODIMENTS

The general principle of the invention relies on the adaptive selection of the insertion zone of the watermarking bit. In other words, the general principle of the invention consists, in the context of a technique for the watermarking of a video sequence by the insertion of a mark into the motion vectors, in considering several motion vectors which represent potential watermarked motion vectors, belonging to different zones having the same binary value of a reference grid associated with the image, and in choosing, from among these vectors, an optimal watermarked motion vector enabling the optimizing of a predetermined criterion, for example a criterion of robustness or invisibility of the watermarking.

The watermarking of video sequences can be seen to be a necessity to protect their contents.

Indeed, the protection of video contents has hitherto been carried out through the existence of systems, known as proprietary systems, which however have shown their weaknesses. Such systems generally rely upon the existence of a secret which, once disclosed, can easily be misused and therefore no longer provides for any efficient protection of the video contents. This is the case for example of the CSS ("Content Scrambling System") used for the protection of DVDs (or "Digital Versatile Disks").

The utility of watermarking lies in the fact that the protection is invisible to the user and that the medium does not suffer conceptual deterioration (as in systems that encrypt the medium): the data carrier on which the video sequence is recorded is therefore perfectly usable.

Video watermarking in particular has applications in the following fields:
digital cinema for which it is sought, by watermarking, to prevent a malicious individual from recording a film projected on the screen;
the protection of DVDs, for which it is sought to prevent the spread of unauthorized copies, by watermarking technique that are more robust than the methods used hitherto to protect carriers of this kind;
online cinema, which represent one of the future applications of high bit rate networks and is a system close to the present pay-per-view system.

The watermarking prevents copying of films or enables distributed contents to be tracked.

The watermarking algorithm proposed by the present invention relies on the hierarchical and adaptive insertion of a mark into the motion vectors of a video sequence.

Figure 1:
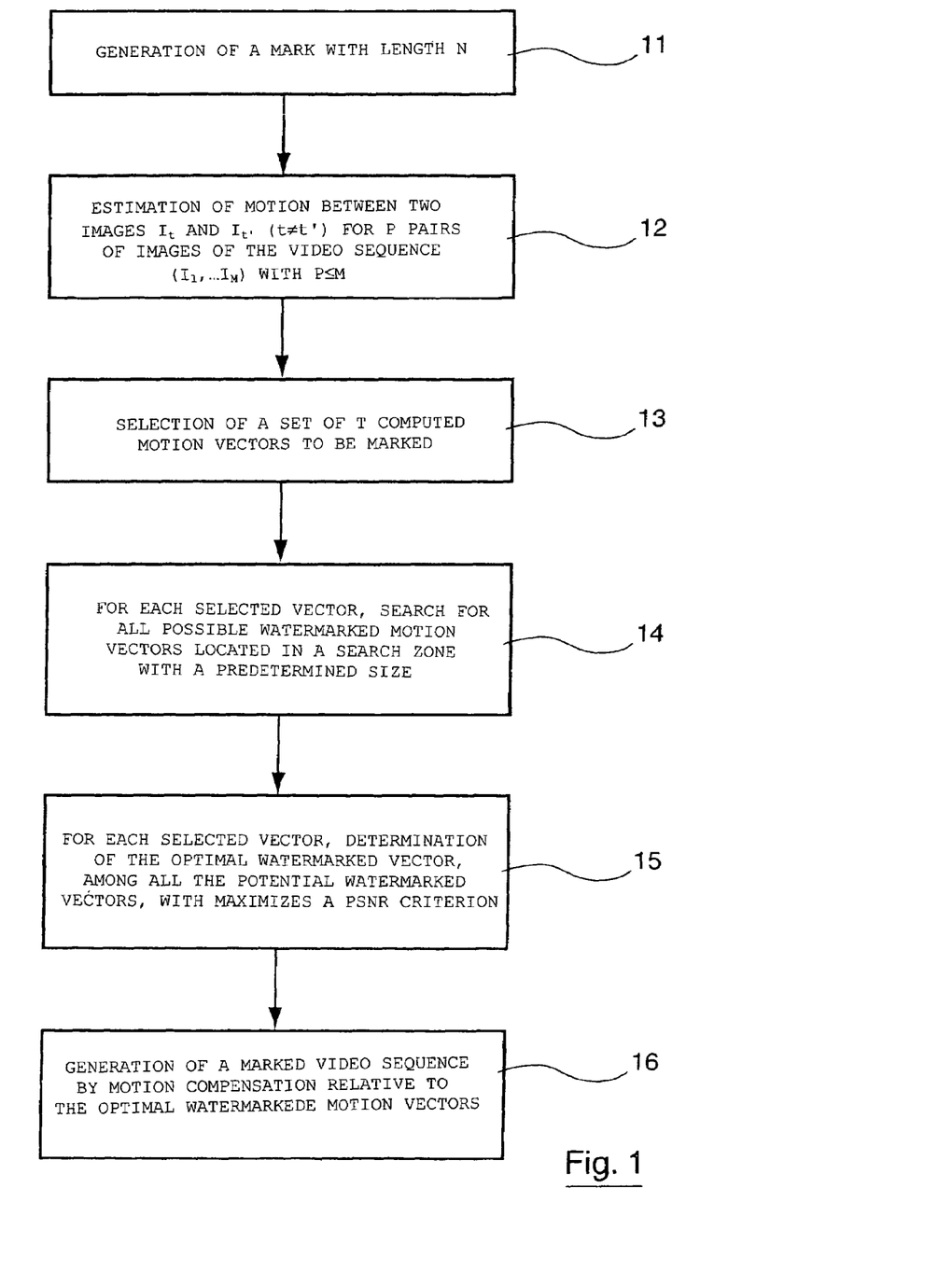
FIG. 1 is a block diagram of the different steps implemented by the method for the watermarking of a video sequence of the invention.

Its different steps are described henceforth in greater detail with reference to FIG. 1.

During a first step referenced 11, a mark with a given length N is generated in the form of a succession of N bits with a value 0 or 1.

During a second step referenced 12, an estimation of motion between two images $I_t$ and $I_t'$ ($t \neq t'$) for P pairs of the video sequence (I1, ..., IM) with P<=M is performed. This motion estimation, implemented according to well-known technique (for example a "block matching" type of technique), is used to compute a field of motion vectors between the images $I_t$ and $I_t'$, for each of the P pairs of images considered.

T vectors are then selected (13) from among all the motion vectors computed according to a predetermined criterion (for example determined by a Yarrow type of PRNG (pseudo-random number generator) process into which the bits of the generated mark (11) are inserted.

For each vector selected, a search zone of a predetermined size (for example a zone constituted by all the zones of an adequate binary value of the block of the reference grid in which the selected vector is located, and of each of the blocks that are adjacent to it) is then scanned (14) to determine all the motion vectors that represent potential watermarked motion vectors corresponding to the selected vector.

Depending on a predetermined criterion (for example a PSNR type criterion of invisibility of the mark), the optimal watermarked motion vector is selected (15) from among all the motion vectors that represent potential watermarked motion vectors.

During a step referenced 16, the marked video sequence is finally generated by performing motion compensation relative to the optimal watermarked motion vectors.

Each of the other steps referenced 11 to 16 here above shall now be described in greater detail.

The mark generated during the step referenced 11 may represent a piece of information (of the copyright or other type) and is transcribed into binary mode $\{-1,1\}$ with a given length N. It is therefore constituted by N bits, each inserted into a motion vector of the image sequence. To increase the robustness of the mark, it may be inserted redundantly into the video sequence: in other words, several distinct motion vectors of this sequence may bear the same watermarking bit.

To insert the mark redundantly, it is possible especially to carry out a motion estimation between two images $I_t$ and $I_t'$ ($t \neq t'$) for P as pairs of the video sequence (I1, ..., IM) with $P \leq M$. The mark could then be inserted T/N times into the sequence.

In a particular embodiment, the motion estimator used is of the "block matching" type and motion estimation is performed between the images t and t+1 of the sequence (respectively between the images t+1 and t, depending on whether it is a front or rear motion estimation that is made).

It may be recalled that "block matching" is an operation wherein, for each block of pixels at the image considered, an assessment is made of the best motion vector enabling the reconstruction of this current block from a same-sized block of the previous or following image, shifted by means of the motion vector. To do this, a search is made around the current block in the previous image or next image, in order to determine the motion vector that minimizes a classic cost function known as a DFD ("Displaced Frame Difference") function representing the difference between the block in previous or following image displaced and the current block in the image considered.

In a preferred embodiment of the invention, a hierarchical motion estimation of L levels is carried out for the marking (with $L \geq 1$). A hierarchical approach of this kind (with the use of a plurality of imbricated levels) advantageously enables the spreading of the mark.

Figure 2:
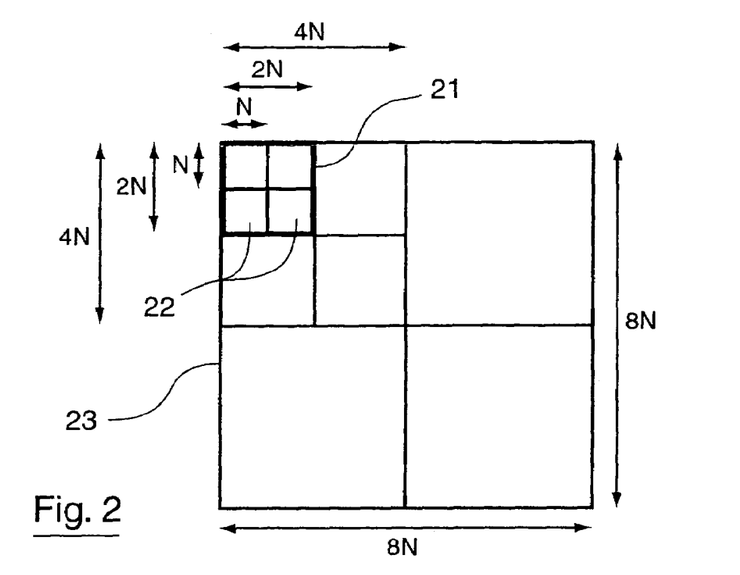
FIG. 2 illustrates the hierarchical decomposition of an image into blocks.

To achieve this, the image is considered to be constituted by a set of blocks 21 sized 2N×2N pixels, themselves divided into sub-blocks 22 with a size of N×N pixels for example, and so on and so forth. A motion estimation is carried out on the N×N-sized blocks 22 in order to obtain the motion vectors associated with each of these blocks. An operation is then performed to take the average of the motion vectors obtained, in order to determine the motion vectors of the higher hierarchical level associated with each of the 2N×N-sized blocks 21. This operation for calculating the average may be continued for the 4N×4N-sized blocks 23 and so on and so forth until the coarsest hierarchical level.

The motion estimation is then carried out on a fairly fine hierarchical level, and from this fine estimation, the motion vectors associated with the coarsest hierarchical levels are determined.

A particular embodiment of the invention uses two hierarchical levels and the initial blocks used during the motion estimation have a size of 4×4 pixels.

When all the motion vectors have been computed during the motion estimation step 12, the operation is located at the coarsest level of the hierarchy and a set of T motion vectors (and therefore a set of blocks with which they are associated), on which the watermark will be inserted, is selected.

The blocks are selected according to a predefined rule which may be deterministic or pseudo-random. In a particular embodiment, a Yarrow type pseudo-random PRNG selection is used. It is the blocks of the coarsest level that are selected.

After the selection 13 of the T motion vectors into which it is desired to insert the mark, a search 14 is then made, with respect to each of these vectors, for all the motion vectors that represent corresponding potential watermarked motion vectors in a predetermined search zone.

Figure 3:
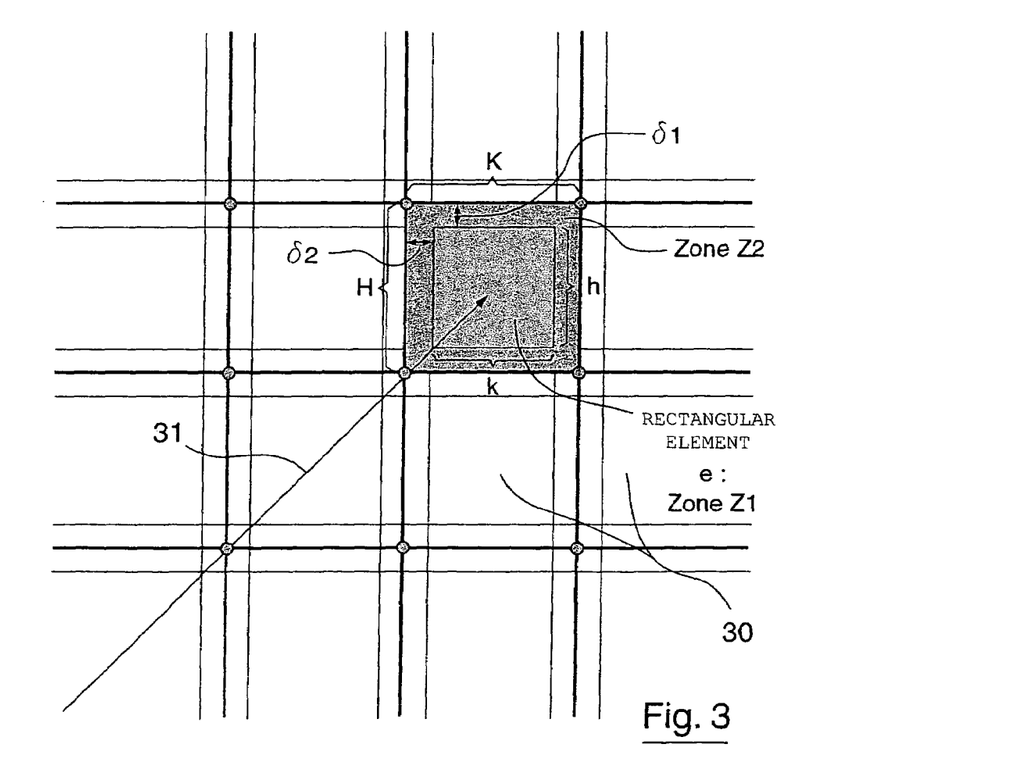
FIG. 3 is an example of a reference grid partitioned into two types of zones, each associated with a distinct binary value, in which the motion vectors according to the invention are placed.

To do so, a reference grid illustrated in FIG. 3 is used.

In the embodiment shown in this figure, this grid is rectangular and is generated in the Cartesian domain. The x-axis corresponds to the rows of the images and the y-axis corresponds to the columns.

The grid consists of a plurality of H×K-pixel-sized rectangular blocks 30. A particular embodiment of the invention uses a square grid with H=K=7 pixels.

Each block has two complementary zones Z1 and Z2. The zone Z1 is rectangular with a size of h×k pixels, and is centered in the block 30. The zone Z2 is located at the periphery of Z1, between Z2 and the boundaries of the block.

Preferably, the values of h and k are chosen such a way that the zones Z1 and Z2 have the same area.

The zone Z1 is associated with the binary value 1 and the zone Z2 with the binary value 0.

Each selected motion vector 31 is then placed on the grid, and the block 30, as well as the zone Z1 or Z2 in which it is located is determined.

If the vector 31 is located in the zone Z1, as shown in FIG. 3, and if it is desired to insert a watermarking bit with a value 1 into this vector 31, it is not necessary to shift the vector 31 by modifying its coordinates.

If, however, it is desired to insert a watermarking bit with a value 0 into the vector 31, then the coordinates of the motion vector 31 have to be modified so that it is located in a zone Z2 of the grid associated with the binary value 0.

Conversely, if the vector 31 is located in the zone Z2 and if it is desired to mark it with a value 0, it is not necessary to modify it. If however it is desired to mark it with the value 1, then its coordinates must be modified to obtain a watermarked motion vector located in the zone Z1 of the reference grid.

Figure 8:
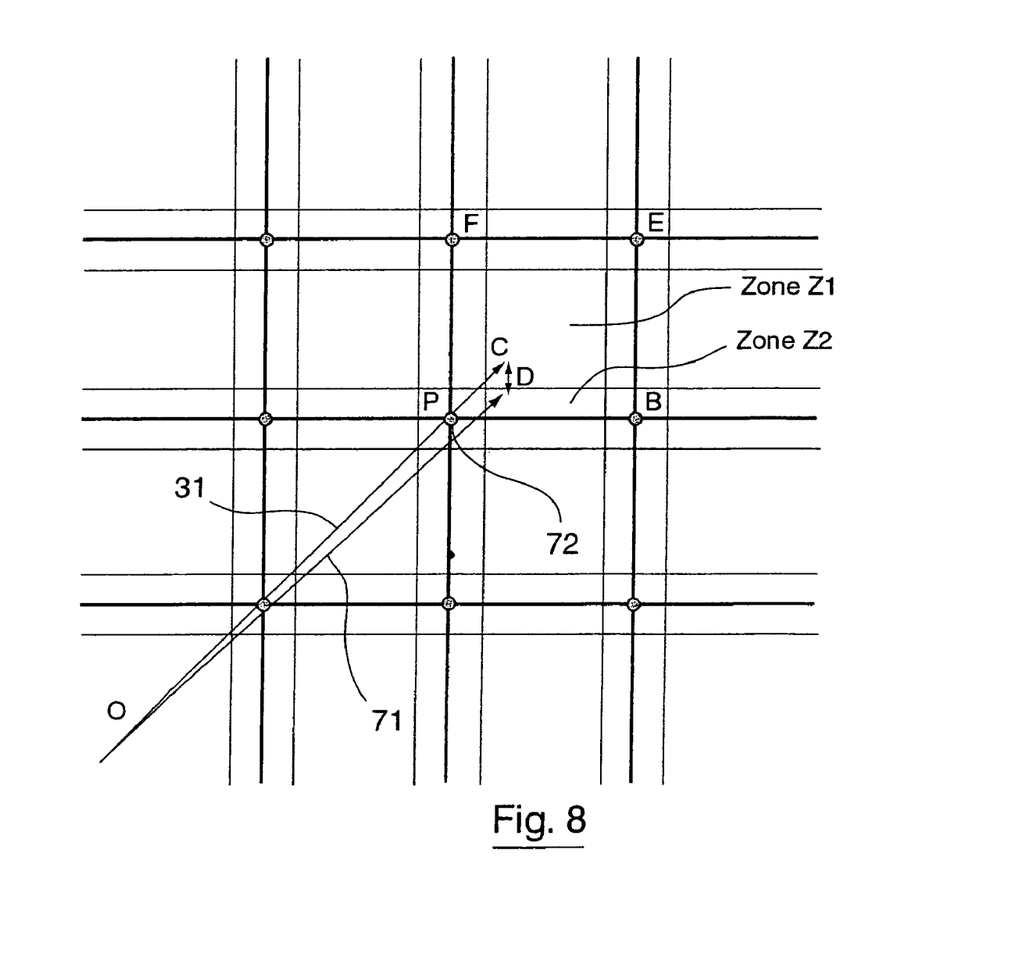
FIG. 8, commented upon in appendix 1, illustrates the watermarking technique described in the French patent application No. 02 13660.

Appendix 1, which is an integral part of the present patent application, provides a description with reference to FIG. 8 of the technique for watermarking a motion vector 31 described in the patent application No. FR 02 13660.

According to this technique, the model of modification of the motion vectors 31 was a deterministic model. According to the present invention, however, this watermarking technique is improved by broadening the search space of the watermarked motion vector.

The present invention therefore consists of an improvement of the technique described in appendix 1 in that, after the selection of the representative motion vectors designed to bear the watermark, the insertion zone (i.e. the zone in which the watermarked motion vector will be located after modification of its coordinates) will be adaptively selected in the neighborhood of the vector selected for the marking.

Indeed, according to the technique that is the object of the patent application No. FR 02 13660, each selected motion vector is associated with a single reference point (corresponding to the end of the block of the reference grid closest to the end of the motion vector in which it is located). The coordinates of the watermarked motion vector are determined directly according to predefined rules, as a function of the distance and position of the motion vector relative to this reference point: the watermarked vector is always located in a direct neighborhood of the associated reference point.

According to the present invention however, a search is made for the optimal position of the watermarked motion vector, not only in the vicinity of the reference point but also in a more or less large neighborhood of this reference point.

This search enables the selection of a zone for the insertion of the mark (namely the zone in which the watermarked motion vector is located) that is optimal in terms of PSNR and robustness.

Figure 4:
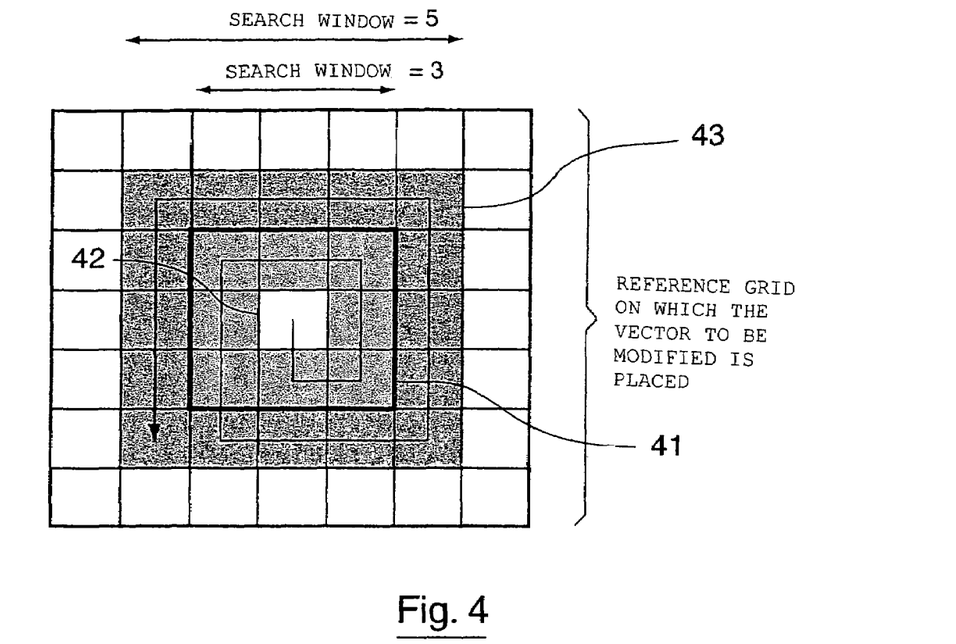
FIG. 4 describes the principle of searching for the set of potential watermarked motion vectors of a given search zone of the grid of FIG. 3.

In a particular embodiment shown in FIG. 4, the zone chosen as a search zone is a set 41 of 9 blocks centered on the block 42 (including this block 42) of the reference grid 43. In other words, apart from the block 42 in which the motion vector to be marked 31 is located, a search is also made for the potential watermarked motion vectors in a search window three blocks wide, comprising all the blocks directly adjacent to the blocks 42.

Naturally, within this search zone, the only motion vectors considered are those that represent potential watermarked motion vectors located in the zones Z1 or Z2 corresponding to the watermarking bit to be inserted.

Thus, as illustrated in FIG. 4, it is also possible to choose a 5×5-block search window 43 for example. The size of the search window can be parametrized.

Instead of building the watermarked vector by simple symmetry, as described in appendix 1, during the step referenced 14, an exhaustive search is made in the search zone 41 or 43 determined from the reference point associated with the motion vector 31.

The step 15 for determining the optimal watermarked motion vector then consists in positioning the motion vector 31 on all the pixels of the search zone 41 or 43 which maximizes a criterion based on the computation of the PSNR.

Figure 5:
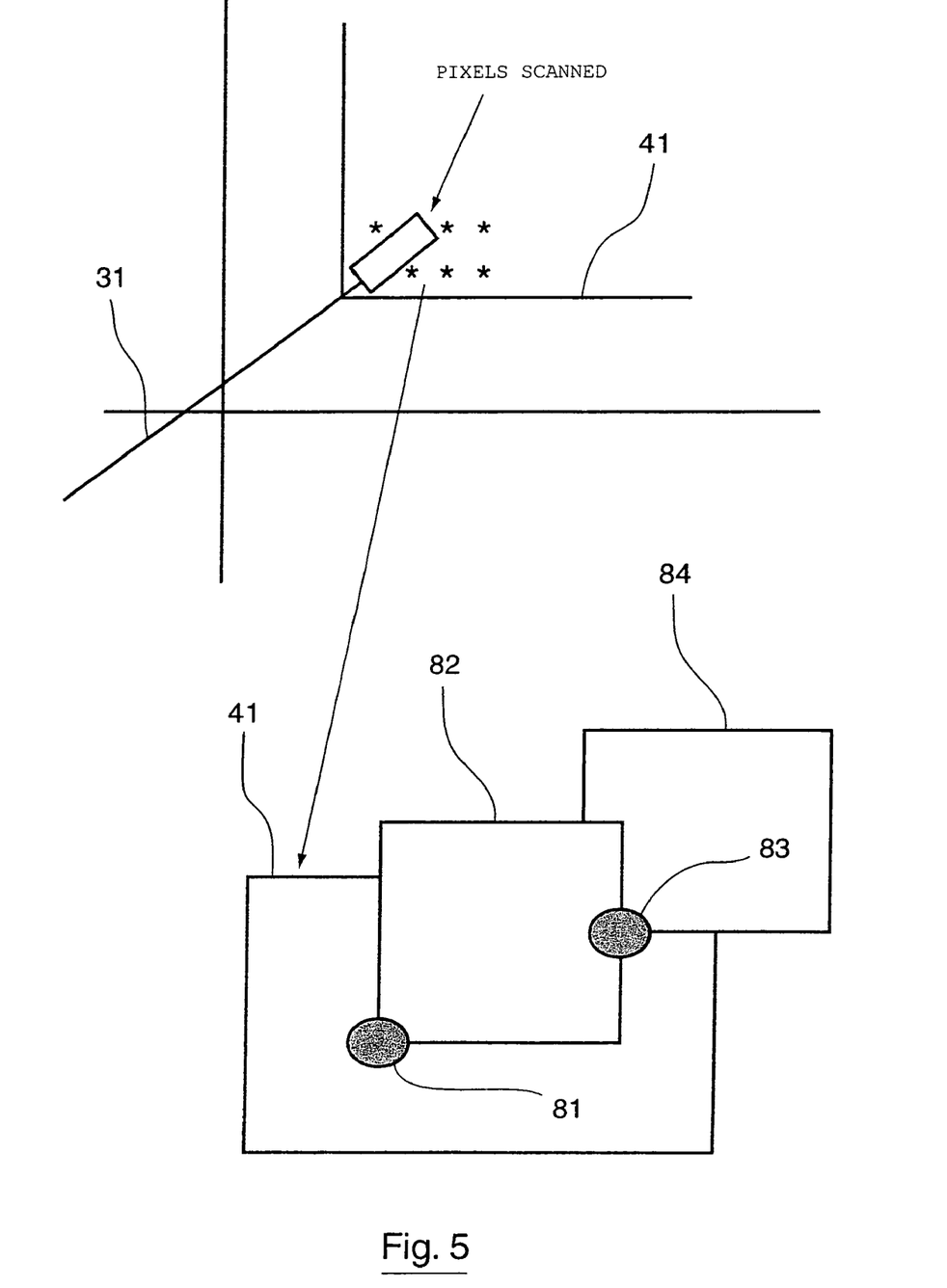
FIG. 5 provides a more detailed illustration of the way in which all the pixels of the search zone of FIG. 4 are scanned to determine the optimal watermarked motion vector.

To do this, a scan is carried out on all the 8×8-pixel-sized blocks 30 of the search zone 41 or 43 (in modifying the coordinates of the motion vector 31 accordingly), as illustrated in FIG. 5.

The motion vector 31 is successively positioned on each of the pixels (81, 83 for example) of the search zone 41 (or 43). Each pixel 81 (and 83 respectively) scanned has an associated block 82 (and 84 respectively) built in such a way that the pixel 81 (and respectively 83) is located at the left-hand bottom of this block. The different blocks 82, 84 are not separated and may overlap.

It is these different blocks 82, 84 associated with the current pixel 81, 83 that are used to determine the PSNR, as explained here below with reference to FIG. 7.

Figure 6:
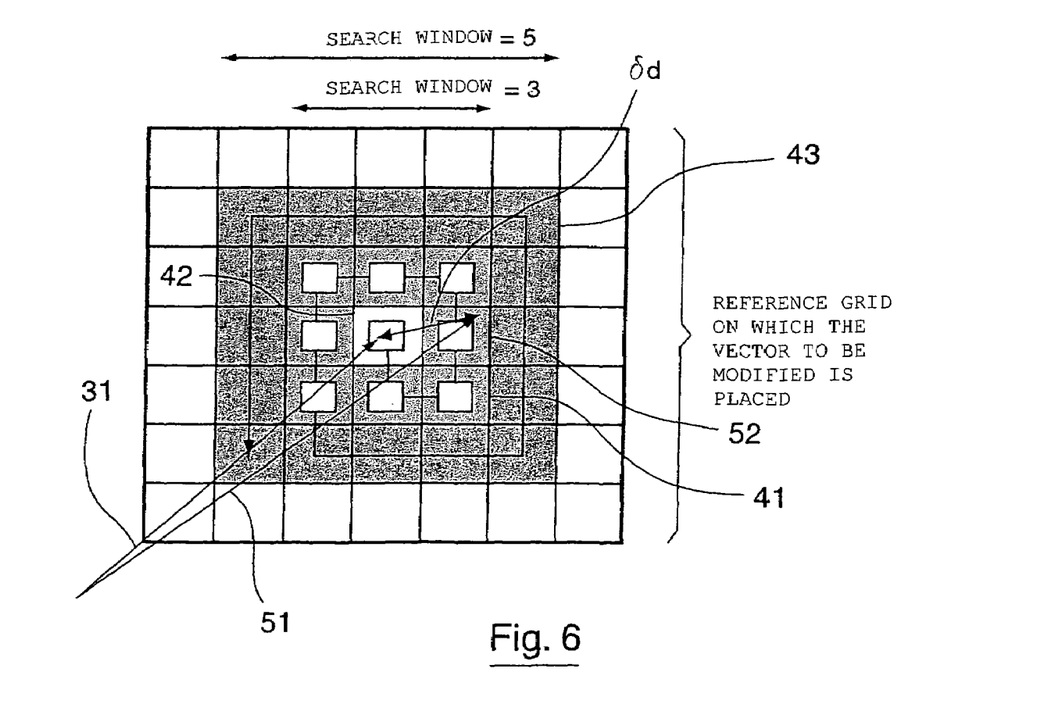
FIG. 6 shows an example of a potential watermarked motion vector of the search zone of FIG. 4.

A variation δd is then determined, the variation corresponding to the shift of the motion vector 31 between each of the new 8×8-sized blocks 82, 84 of the region 52 of the reference grid and the original block 42, as illustrated in FIG. 6.

It will be noted that, in FIG. 6, the unmarked motion vector 31 is located in a zone Z1 associated with the binary value 1 of the block 42. The motion vector 51, which represent a potential watermarked motion vector, is located in the zone Z2 associated with the binary value 0 of the region 52, which corresponds to the insertion of a watermarking bit 0.

Figure 7:
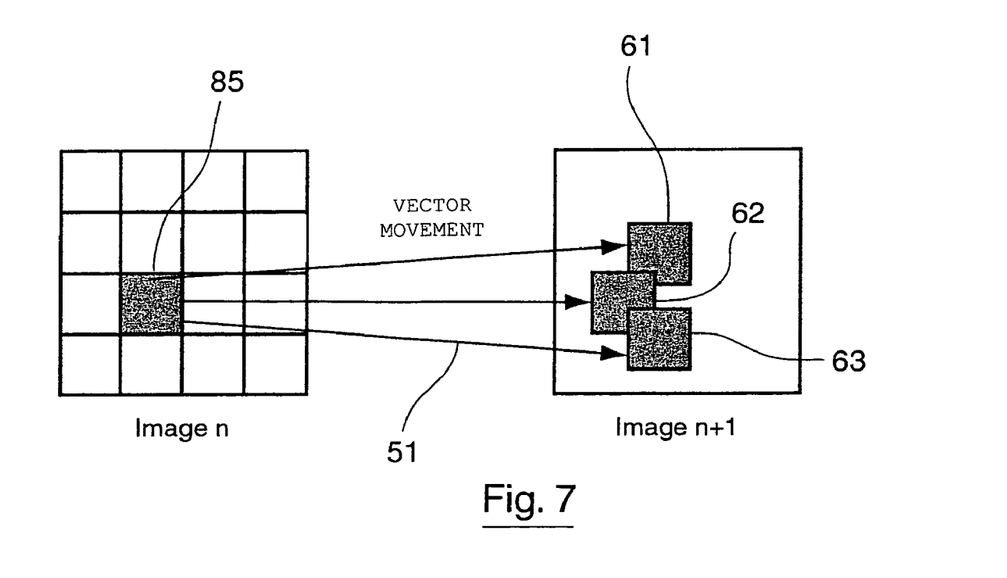
FIG. 7 illustrates the use of the PSNR criterion used to determine an optimal watermarked vector in the context of a blockwise approach.

As illustrated in FIG. 7, each motion vector 51, which represents a potential watermarked motion vector of an image n of the video sequence, when it is applied to an initial block 85, makes it possible to obtain a compensated block 61, 62 or 63 for example, of the next image n+1.

The PSNR between the initial block 85 and each of the other compensated blocks 61, 62 and 63 is computed.

It may be recalled that the PSNR is defined, in decibels, by the following formula:

$$PSNR = 10 \log \frac{m^2}{MSE},$$

where m is the maximum value that can be taken by a pixel (for example 255 if images in eight-bit gray levels are considered), and where MSE designates a mean square error between two images I and Î defined by:

$$MSE = \frac{1}{TXY} \sum_t \sum_x \sum_y [I(x, y, t) - \hat{I}(x, y, t)]^2,$$

for images sized X×Y of a sequence of T frames.

The optimal watermarked motion vector is the one that makes it possible, from the initial block 85, to obtain the block 61, 62 or 63 for which the highest PSNR is obtained: indeed, this block is one used to obtain the most faithful representation of the original image.

The variation δd associated with this optimal watermarked motion vector is then applied to the motion vectors of the four 4×4-sized child blocks of the initial block 85.

From the computation of PSNR for each of the 4×4-sized blocks, the average PSNR for all these blocks is deduced.

When the optimal watermarked motion vector has been selected, the operation descends into finer levels of the hierarchy, in order to transfer the modifications of the coordinates of the motion vector to the vectors of the finest level, so as to obtain a spreading of the mark.

The invention therefore implements a hierarchical approach to the watermarking method.

When all the motion vectors selected during the step referenced 13 have been watermarked, they are used to generate (16) the marked video sequence in performing a compensation of motion.

Two methods can then be envisaged:
  according to a first method, a motion compensation is carried out on all the blocks of the image, whether these blocks are associated with watermarked or non-watermarked motion vectors;
  in the second method, a compensation is made on the blocks selected during the step referenced 13, and this image is completed by the remaining original blocks, so as to obtain a higher quality image.

According to the invention, the detection of a mark in a watermarked video sequence is done in two steps:
  first of all, a method that is dual to the watermarking method described above is implemented in such a way as to extract the mark. This method consists in:
    carrying out a motion estimation between pairs of images of the watermarked video sequence;
    deducing a set of motion vectors on 4×4-sized blocks of the image;
    taking the average of these motion vectors so as to determine the motion vectors associated with the 8×8-sized blocks;
    placing these average motion vectors on the reference grid;
    for each of these vectors, depending on the position in the zones Z1 or Z2 of the grid, deducing the value 1 or 0 of the watermarking bit that it carries;
    refreshing the mark, in the form of a binary sequence of N bits, from all the watermarking bits extracted;
  a statistical correlation is then performed to determine a threshold of trust characterizing the presence or non-presence of the mark. Indeed, the mark may be inserted redundantly into the image (for example 2.5 times per image), and a statistical correlation step of this kind will be used, for example, to determine whether the mark obtained is truly identical to the mark that had been inserted. The following two rules of correlation may be used:

Correlation rule 1: $C = \dfrac{(\tilde{W}-\overline{\tilde{W}})*(W-\overline{W})}{\sqrt{(\tilde{W}-\overline{\tilde{W}})^2 * (W-\overline{W})^2}}$ $\tilde{W}$: Extracted mark $\overline{\tilde{W}}$: Average of $\tilde{W}$ $W$: Original mark $\overline{W}$: Average of $W$ Correlation rule 2: $C_\eta = \dfrac{C_{\eta-1}*(\eta-1)\left(1-\dfrac{d(\tilde{W},W)}{8}\right)}{\eta}$ $\eta$: Number of images $d(\tilde{W},W)$: Hamming distance In order to validate the detection phase, an accumulation is achieved of the correlation coefficients for the rule 1 in order to obtain an index of trust for the entire video. Rule 2 already represents an accumulation.

Although the present invention has been described with reference to preferred embodiments, workers skilled in the art will recognize that changes may be made in form and detail without departing from the spirit and scope of the invention.

APPENDIX 1

Technique for the Watermarking of a Motion Vector According to the Patent Application No. FR 02 13660 Filed on Behalf of the Applicant for the Present Patent Document The rule of insertion of the mark into a motion vector 31 OC is based on a reference grid illustrated in FIG. 8.

This rectangular grid is generated in the Cartesian domain. The x-axis corresponds to the rows of the images and the y-axis to the columns. The grid is constituted by a set of H×K-pixel-sized elements E. With H, K=1, . . . , J (a particular mode of the invention uses a square grid with H=K=7)

For each motion vector computed during the motion estimation process, the motion vector OC 31 is placed on the grid and its reference point P 72 which corresponds to one of the vertices of the rectangular element E to which the vector OC 31 belongs is determined. To compute the reference point P 72 of a motion vector, the method chooses the point of the rectangular element E which minimizes a distance between the end C of the vector 31 and one of the four vertices of E. In a particular embodiment, the standard L1 is used.

The vector 31 is then modified according to the following rule:

There is generated a rectangular element e included in E with a size h×k with h=H−δ1 and k=K−δ2 with δ1 and δ2 such that the area of e is equal to the area of E−e. The element e corresponds to the zone Z1, associated with the binary value 1 and the element E−e corresponds to the zone Z2, associated with the binary value 0;

If it is desired to insert the bit 1 and if the motion vector is in Z1, nothing is done.

If it is desired to insert the bit 1 and if the motion vector is in Z2, it is shifted to Z1. To do this, C is shifted into D in an axial direction:

$$\begin{cases} V'x = Vx + \delta_2 - PC_x - 1 & cas4a \\ V'y = Vy + \delta_1 - PC_y - 1 & cas4b \end{cases}$$

or according to a center symmetry B:

$$\begin{cases} V'x = Vx + \delta_2 - PC_x - 1 \\ V'y = Vy + \delta_1 - PC_y - 1 \end{cases}$$

where Vx and Vy respectively represent the x-axis and the y-axis of the vector OC 31, and V'x and V'y represent the coordinates of the watermarked vector OD 71.

In other words, when the point C is located at equal distance from the edges BP and FP of E, the vector OC 31 is shifted by weighted center symmetry with a center P, for example according to the following relationship:

$PD=-\tfrac{2}{5}PC.$

If, by contrast, the point C is closer to one of the boundaries of the zone Z1, the point D is obtained by achieving a weighted axial symmetry (for example with a coefficient ⅖) of the vector OC 31 relative to this boundary.

If the bit 0 is to be inserted and if the motion vector is in Z1, it is shifted to Z2 in obtaining a weighted central symmetry with a center B. C is therefore shifted to D.

In a particular embodiment, the weighting used leads to the following modification $$\begin{cases} V'x = Vx + \delta_2 - PC_x - 1 \\ V'y = Vy + \delta_1 - PC_y - 1 \end{cases}$$

It the bit 0 is to be inserted and if the motion vector is in Z2, nothing is done.

What is claimed is:

1. A method for the watermarking of a sequence of video images, implementing a step for the insertion of at least one watermarking bit into at least one motion vector obtained by motion estimation between two images of said sequence, so as to obtain at least one watermarked motion vector, said motion vector being identified by its coordinates in a reference space, associated with a reference grid comprising a plurality of blocks, each block being partitioned into two zones of complementary types, one zone surrounding the other zone, each zone having a distinct binary value associated with it, said insertion step determining in which block and which zone of said block the motion vector is located and implementing, if necessary, a modification of the coordinates of the motion vector so that it is located in a zone with a binary value corresponding to said watermarking bit to be inserted, wherein, during said modification, at least two potential watermarked motion vectors are determined and, from among said potential watermarked motion vectors, an optimal watermarked motion vector is selected according to at least one predetermined criterion, so that the modified coordinates of said motion vector are those of said optimal watermarked motion vector.

2. A watermarking method according to claim 1, wherein said predetermined criterion is a criterion of invisibility of said watermarking.

3. A watermarking method according to claim 1, wherein said reference space is associated with a reference grid comprising blocks of predetermined dimensions, each of said blocks comprising a zone of each of said types.

4. A watermarking method according to claim 3 wherein, said motion vector is located in a reference block of said reference grid, said potential watermarked motion vectors are searched for in a zone of said reference block having a binary value corresponding to said watermarking bit.

5. A watermarking method according to claim 4, wherein said potential watermarked motion vectors are also searched for in a binary value zone corresponding to said watermarking bit, belonging to at least one block adjacent to said reference block.

6. A watermarking method according to claim 4, wherein said potential watermarked motion vectors are all the motion vectors located in said searched zone.

7. A watermarking method according to claim 1, wherein said predetermined criterion is a criterion of optimization of a peak signal-to-noise ratio (PSNR) associated with each of said potential watermarked motion vectors.

8. A watermarking method according to claim 1, wherein, an image of said video sequence being associated with at least two hierarchical levels, said method implements a motion estimation on at least one pair of images of said sequence for at least one of said levels so as to determine a set of motion vectors of said level, and wherein the motion vectors of a higher hierarchical level are obtained by computing an average of the associated motion vectors in the lower level.

9. A watermarking method according to claim 8 comprising a step for the selection, from among the motion vectors of the highest hierarchical level, of at least one motion vector at which said step for the insertion of a watermarking bit is implemented.

10. A watermarking method according to claim 9, wherein said modification of the coordinates of said selected motion vector is also applied to the corresponding motion vectors of at least one of said lower levels, so as to perform a redundant insertion of said watermarking bit.

11. A watermarking method according to claim 1, wherein said motion estimation is of the "block matching" type.

12. A watermarking method according to claim 1, also comprising a step of motion compensation based on said watermarked motion vector or vectors so as to generate a watermarked video image sequence.

13. A watermarking method according to claim 12, wherein each of said motion vectors being associated with a region of said image, said motion compensation is implemented on all the regions of said image, associated with watermarked or non-watermarked motion vectors.

14. A watermarking method according to claim 12 wherein, said motion vectors being each associated with a region of said image, said motion compensation is implemented in the region or regions of said image with which said watermarked motion vector or vectors are associated, and wherein an image of said watermarked video image sequence comprises said regions on which said motion compensation is implemented and at least one original region.

15. A method for the extraction of a watermark from a video image sequence watermarked according to the method of claim 1, comprising a step for the extraction of at least one watermarking bit inserted into at least one watermarked motion vector, said extraction step comprising the sub-steps of:
motion estimation between two images of said sequence, so as to obtain said at least one watermarked motion vector;
analysis of the position of said watermarked motion vector in a reference space, partitioned into two zones of complementary types, one zone surrounding the other zone, each zone having a distinct binary value associated with it;
the assigning to said watermarking bit of the binary value of the zone in which said motion vector is located.

16. A method of extraction according to claim 15 wherein, an image of said video sequence being associated with at least two hierarchical levels, said method implements said motion estimation on at least one pair of images of said sequence for at least one of said levels so as to determine a set of motion vectors of said level,
and wherein the motion vector of a higher hierarchical level is obtained by computing an average of the associated motion vectors in the lower level.

17. A method of extraction according to claim 15, wherein, said watermarking bit being inserted redundantly into said video image sequence, said method of extraction comprises a step for the computation of at least one correlation coefficient used to assign an index of trust to said extracted watermarking bit.

18. A device for the watermarking of a video image sequence, comprising means for the insertion of at least one watermarking bit into at least one motion vector obtained by motion estimation between two images of said sequence, so as to obtain at least one watermarked motion vector,
said motion vector being identified by its coordinates in a reference space, associated with a reference grid comprising a plurality of blocks, each block being partitioned into two zones of complementary types, one zone surrounding the other zone, each zone having a distinct binary value associated with it,
said insertion means comprising means for determining in which block and which zone of said block the motion vector is located and, activated if necessary, for the modification of the coordinates of said motion vector so that it is located in a zone with a binary value corresponding to said watermarking bit to be inserted,
wherein said modification means comprise means for determining at least two potential watermarked motion vectors and for the selection, from among said potential watermarked motion vectors, of an optimal watermarked motion vector, according to at least one predetermined criterion, so that the modified coordinates of said motion vector are those of said optimal watermarked motion vector.

19. A device for the extraction of a watermark from a sequence of video images watermarked according to the watermarking device of claim 18, comprising means for the extraction of at least one watermarking bit inserted into at least one watermarked motion vector, said extraction means comprising means of:
motion estimation between two images of said sequence, so as to obtain said at least one watermarked motion vector;
analysis of the position of said watermarked motion vector in a reference space, partitioned into two zones of complementary types, one zone surrounding the other zone, each zone having a distinct binary value associated with it;

the assigning to said watermarking bit of the binary value of the zone in which said motion vector is located.

20. A computer readable medium comprising program code instructions recorded thereon, that can be used in a computer, comprising:

computer-readable programming means to perform a step for the insertion of at least one watermarking bit into at least one motion vector obtained by motion estimation between two images of said sequence, so as to obtain at least one watermarked motion vector, said motion vector been identified by its coordinates in a reference space, associated with a reference grid comprising a plurality of blocks, each block being partitioned into two zones of complementary types, one zone surrounding the other zone, each zone having a binary value associated with it, said insertion step determining in which block and which zone of said block the motion vector is located;

computer-readable programming means to perform a step for the modification, if necessary, of the coordinates of said motion vector so that it is located in a zone with a binary value corresponding to said watermarking bit to be inserted;

computer readable programming means to perform a step for determining at least two potential watermarked motion vectors and a step for the selection, from among said potential watermarked motion vectors, of an optimal watermarked motion vector according to at least one predetermined criterion, so that the modified coordinates of said motion vector are those of said optimal watermarked motion vector.

21. A computer-readable medium comprising program code instructions recorded thereon, that can be used in a computer, comprising:

computer-readable programming means to perform a step of extraction of at least one watermarking bit inserted into at least one watermarked motion vector, said watermarked motion vector being an optimal watermarked motion vector, which has been selected, among a plurality of potential watermarked motion vectors, according to at least one predetermined criterion, computer-readable programming means to perform a step of motion estimation between two images of a watermarked video image sequence, so as to obtain said at least one watermarked motion vector;

computer-readable programming means to perform a step of analysis of the position of said watermarked motion vector in a reference space, associated with a reference grid comprising a plurality of blocks, each block being partitioned into two zones of complementary types, one zone surrounding the other zone, each of which has a distinct binary value associated with it, and determining in which block and which zone of said block the watermarked motion vector is located; and computer-readable programming means to perform a step of assigning to said watermarking bit of the binary value of the zone in which said watermarked motion vector is located.

* * * * *

UNITED STATES PATENT AND TRADEMARK OFFICE
CERTIFICATE OF CORRECTION

PATENT NO. : 7,386,147 B2  
APPLICATION NO. : 10/811312  
DATED : June 10, 2008  
INVENTOR(S) : Yann Bodo et al.

Page 1 of 1

It is certified that error appears in the above-identified patent and that said Letters Patent is hereby corrected as shown below:

Column 19
Line 14, delete "been" and insert --being--

Signed and Sealed this

Twenty-fourth Day of November, 2009

David J. Kappos
*Director of the United States Patent and Trademark Office*